(12) United States Patent
Namiki

(10) Patent No.: US 6,832,103 B2
(45) Date of Patent: Dec. 14, 2004

(54) MOBILE COMMUNICATION TERMINAL IN WHICH START OPERATION IS SIMPLIFIED

(75) Inventor: Hideo Namiki, Tokyo (JP)

(73) Assignee: NEC Corporation, Tokyo (JP)

( * ) Notice: Subject to any disclaimer, the term of this patent is extended or adjusted under 35 U.S.C. 154(b) by 531 days.

(21) Appl. No.: 09/838,002

(22) Filed: Apr. 19, 2001

(65) Prior Publication Data

US 2001/0034247 A1 Oct. 25, 2001

(30) Foreign Application Priority Data

Apr. 20, 2000 (JP) .......................................... 2000-118902

(51) Int. Cl.[7] .............................................. H04M 1/00
(52) U.S. Cl. ........................ 455/558; 455/411; 713/200; 713/202; 380/249
(58) Field of Search ................................ 455/572, 574, 455/558, 411; 380/23, 24, 25, 249, 270, 42, 43; 713/168, 172, 151, 202, 310, 320, 323, 324, 330, 200

(56) References Cited

U.S. PATENT DOCUMENTS

| | | | | |
|---|---|---|---|---|
| 4,959,860 | A | * | 9/1990 | Watters et al. .............. 713/202 |
| 5,201,066 | A | * | 4/1993 | Kim .......................... 455/411 |
| 5,673,306 | A | | 9/1997 | Amadon et al. |
| 5,812,667 | A | * | 9/1998 | Miki et al. ................. 380/249 |
| 6,067,621 | A | * | 5/2000 | Yu et al. ..................... 713/172 |
| 6,278,887 | B1 | * | 8/2001 | Son et al. ................... 455/566 |
| 6,298,447 | B1 | * | 10/2001 | Wang .......................... 713/202 |
| 6,381,477 | B1 | * | 4/2002 | Johnson et al. ............. 455/572 |
| 6,466,781 | B1 | * | 10/2002 | Bromba et al. ............. 455/411 |
| 6,594,482 | B1 | * | 7/2003 | Findikli et al. ............. 455/411 |
| 6,696,919 | B1 | * | 2/2004 | Leickel et al. ............. 340/5.74 |

FOREIGN PATENT DOCUMENTS

| | | |
|---|---|---|
| JP | 6-216842 | 8/1994 |
| JP | 9-27839 | 1/1997 |
| JP | 9-84101 | 3/1997 |
| JP | 10-243466 | 9/1998 |
| JP | 11-191805 | 7/1999 |
| JP | 11-313148 | 11/1999 |

* cited by examiner

Primary Examiner—Charles Appiah
Assistant Examiner—Joy K. Contee
(74) Attorney, Agent, or Firm—Scully, Scott, Murphy & Presser

(57) ABSTRACT

A mobile communication terminal includes an IC card, a power supply, and a control section. The IC card stores an identification number. The power supply supplies power to the mobile communication terminal. The control section can set the mobile communication terminal to a communication possible state when the power is supplied from the power supply and an entered identification number is coincident with the identification number stored in the IC card. Also, the control section can set the mobile communication terminal to the communication possible state depending on a power down time period without an entering operation of the identification number when the supply of the power to the mobile communication terminal is stopped and then recovered.

12 Claims, 3 Drawing Sheets

MOBILE COMMUNICATION TERMINAL IN WHICH START OPERATION IS SIMPLIFIED

BACKGROUND OF THE INVENTION

1. Field of the Invention

The present invention relates to a mobile communication terminal which is set to a communicable state by mounting a detachable IC card and, a communication start method of the same.

2. Description of the Related Art

In recent years, there is an increasing demand for mobile radio communication apparatuses, namely terminal apparatuses such as a portable telephone and a car telephone, along with needs for personal communication. Also, there are various mobile radio communication systems such as an analog cellular system, a digital cellular system and a cordless telephone system. Especially, the GSM (Global System for Mobile communications) system is one of the digital cellular systems and a pan-European standard.

Such a mobile radio communication terminal used for the GSM system is composed of a mobile radio communication terminal main unit, an SIM (Subscriber Identity Module) card, and a battery pack. The SIM card stores data about a terminal user. This data includes a subscriber number (IMSI: International Mobile Subscriber Identify), an identification number (PIN: Personal Identification Number), a service status code, and abbreviated telephone numbers entered by a subscriber. The battery pack supplies power required for the operation of the mobile radio communication terminal. The mobile radio communication terminal main unit contains an antenna, a keyboard, a display unit, and a control section for controlling transmission and reception of signals. Also, the mobile radio communication terminal contains a storage section for temporarily storing the terminal user data stored in the SIM card. The information stored in the storage section is held while the mobile radio communication terminal main unit is supplied with the power from the battery pack. When no power is supplied from the battery pack, the mobile radio communication terminal main unit cannot hold the terminal user data.

An operation of the mobile radio communication terminal to start access to a network in the GSM system will be described below.

First, the mobile radio communication terminal main unit with the SIM card attached is turned on. Then, the mobile radio communication terminal main unit checks whether the attached SIM card belongs to the terminal user. In the checking operation, the identification number entered from a keyboard by the terminal user is compared with the PIN number stored in the SIM card. When the entered identification number is coincident with the PIN number, it is confirmed that the SIM card attached to the mobile radio communication terminal main unit belongs the terminal user. The mobile radio communication terminal main unit stores in the storage section, the terminal user data which has been stored in the SIM card. After completing the above-mentioned operation, the mobile radio communication terminal main unit is set to an accessible state to the network. Once the mobile radio communication terminal main unit is made accessible to the network, the access to the network is permitted through only the operation for power on as long as the data stored in the storage section is not deleted.

The storage section can hold the terminal user data unless the battery pack is detached from the mobile radio communication terminal main unit. On contrast, even if the battery pack is temporarily detached, the mobile radio communication terminal main unit prompts a terminal user to enter the identification number for confirming that the attached SIM card belongs to the terminal user.

A mobile communication terminal usable in the GSM system is demanded in which communication is possible without requesting a terminal user to enter the identification number even when the battery pack is detached from the mobile radio communication terminal main unit.

In conjunction with the above description, a portable phone is disclosed in Japanese Laid Open Patent Application (JP-A-Heisei 9-27839). In this reference, when an IC card (2) with charge is attached to a portable phone main unit (1), charge is removed by electrostatic brush (3). Also, an attachment switch (4) and a detachment switch (5) forcibly switch off the power of the portable phone main unit when the IC card is attached or detached. Thus, the attaching or detaching operation of the IC card is carried out in the power off state of the portable phone main unit so that destruction of data and any erroneous operation are prevented.

Also, a mobile phone is disclosed in Japanese Laid Open Patent Application (JP-A-Heisei 9-84101). In this reference, when the mobile phone (1) with a SIM card (2) is used, SIM data is read out from the SIM card (2), and transferred to a memory (47) in the mobile phone and stored therein. The SIM data added or updated during a communicating operation are transferred to a SIM memory (8) and stored therein when the communication is ended. The communication with the SIM card (2) and the storing operation in the SIM memory (8) are carried out by a SUB-CPU (30) which is backed up by a power supply (34) different from a main power supply (3). Even if the operation of a main processor (9) in the mobile phone is stopped because of the voltage change of the main power supply (3), or the careless power off during use of the mobile phone, the SIM data having been stored in the memory (47) can be normally stored in the SIM memory (8).

SUMMARY OF THE INVENTION

An object of the present invention is to provide a mobile communication terminal which can communicate in the state in which an IC card is attached.

Another object of the present invention is to provide a mobile communication terminal which can be connected with a network without identifying an owner of the attached IC card even when the battery pack is temporarily removed from the terminal.

Still another object of the present invention is to provide a mobile communication terminal which can be used in the GSM system.

Yet still another object of the present invention is to provide a mobile communication terminal which can be connected with a network without entering an identification number even when the battery pack is temporarily removed from the terminal.

In an aspect of the present invention, a mobile communication terminal includes an IC card, a power supply, and a control section. The IC card stores an identification number. The power supply supplies power to the mobile communication terminal. The control section can set the mobile communication terminal to a communication possible state when the power is supplied from the power supply and an entered identification number is coincident with the identification number stored in the IC card. Also, the control section can set the mobile communication terminal to the communication possible state depending on a power down time period without an entering operation of the identification number when the supply of the power to the mobile communication terminal is stopped and then recovered.

In this case, while the power is supplied from the power supply, the control section reads out the identification number from the IC card. The mobile communication terminal may further include a storage section and an encrypting section. The encrypting section encrypts the read out identification number using a random number, stores the encrypted identification number in the storage section, and holds the random number.

In this case, the mobile communication terminal may further include a detecting section, and a measuring section. The detecting section detects the power down of the power supplied from the power supply to generate a power down signal, and detects recovery of the power supplied from the power supply to generate a power recovery signal. The measuring section starts counting of the power down time period in response to the power down signal and stops the counting of the power down time period. In this case, the control section reads out the encrypted identification number from the storage section, decrypts the encrypted identification number using the random number held in the encrypting section, when the counted power down time period between the power down and the power recovery is shorter than a predetermined time period. Thus, the control section sets the mobile communication terminal to the communication possible state when the decrypted identification number is coincident with the identification number stored in the IC card.

In this case, the measuring section may delete the random number held in the encrypting section, when the counted power down time period after the power down is equal to or longer than the predetermined time period.

Also, the mobile communication terminal may further include a backup power supply. The storage section and the encrypting section are operable based on power supplied from the backup power supply when the supply of the power from the power supply is down.

Instead, the storage section, the encrypting section, the detecting section and the measuring section are operable based on power supplied from the backup power supply when the supply of the power from the power supply is down.

Also, the IC card may be composed of a SIM card.

In another aspect of the present invention, a method of setting a mobile communication terminal to a communication possible state, is attained by (a) supplying power from a power supply; by (b) entering an identification number from an operation unit; by (c) comparing the entered identification number with an identification number stored in an IC card; by (d) setting the mobile communication terminal to the communication possible state when the power is supplied from the power supply and an entered identification number is coincident with the identification number stored in the IC card; and by (e) setting the mobile communication terminal to the communication possible state depending on a power down time period without the (b) entering step when the supply of the power from the power supply is downed and then recovered.

In this case, the (d) setting step may be attained by (f) reading out the identification number from the IC card while the power is supplied from the power supply; by (g) encrypting the read out identification number using a random number; by (h) storing the encrypted identification number in a storage section; and by (i) holding the random number.

Also, the (e) setting step may be attained by detecting the power down of the power supplied from the power supply to generate a power down signal; by detecting the recovery of the power supplied from the power supply to generate a power recovery signal; by counting of the power down time period in response to the power down signal and stops the counting of the power down time period; by reading out the encrypted identification number from the storage section; by decrypting the encrypted identification number using the random number held in the encrypting section, when the counted power down time period between the power down and the power recovery is shorter than a predetermined time period; and by setting the mobile communication terminal to the communication possible state when the decrypted identification number is coincident with the identification number stored in the IC card.

Also, the (e) setting step may further include deleting the random number held in the encrypting section, when the counted power down time period after the power down is equal to or longer than the predetermined time period.

Also, the IC card may be composed of a SIM card.

DESCRIPTION OF THE PREFERRED EMBODIMENTS

Hereinafter, a mobile communication terminal according to the present invention will be described below in detail with reference to the attached drawings. The mobile communication terminal according to an embodiment of the present invention is compliant to the GSM system but is not limited thereto.

Figure 1:
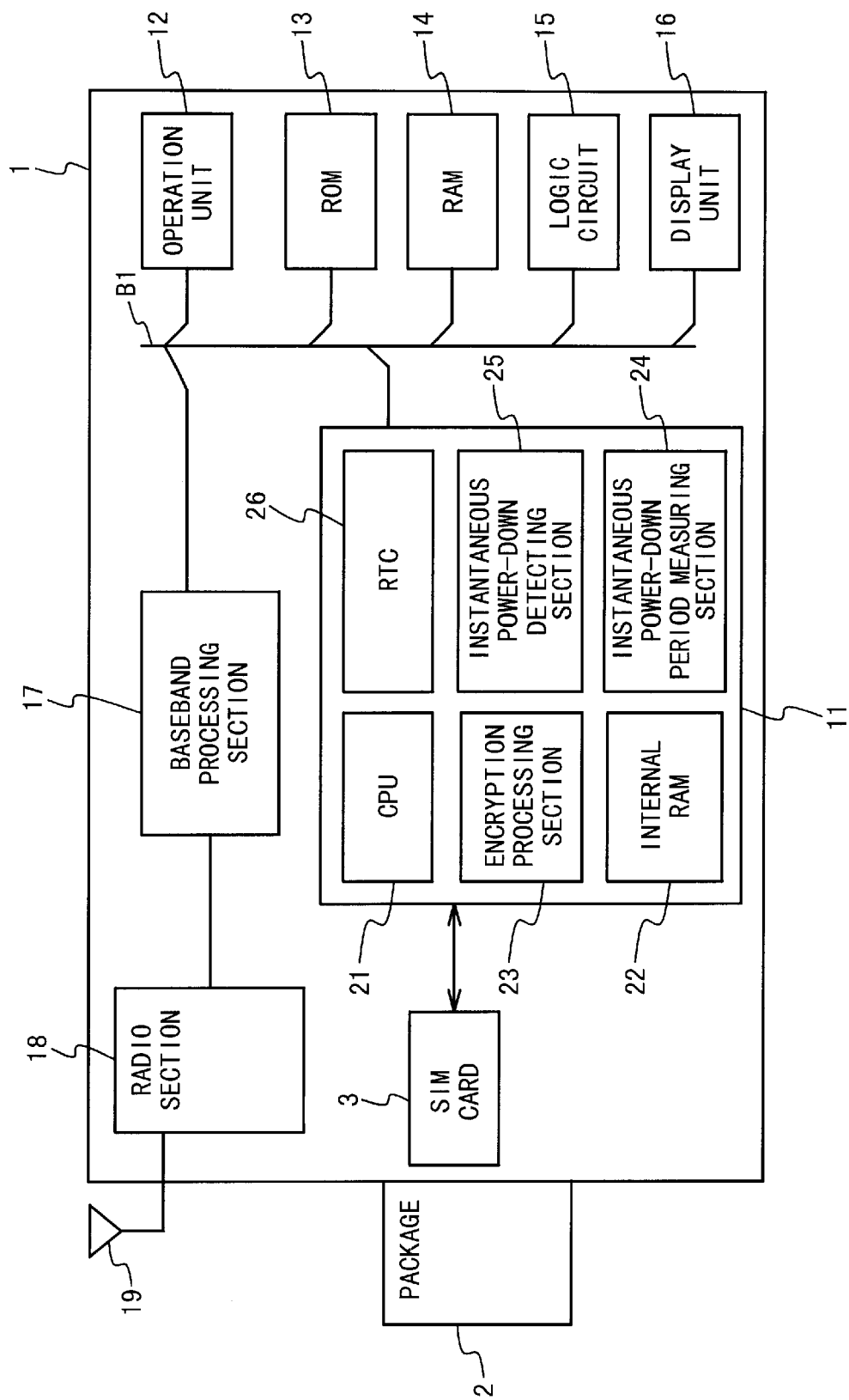
FIG. 1 is a block diagram showing the structure of a mobile communication terminal of the present invention.

FIG. 1 shows the structure of the mobile communication terminal according to the embodiment of the present invention. Referring to FIG. 1, the mobile communication terminal according to the present invention is composed of a mobile communication terminal main unit 1, a battery pack 2 and a SIM card 3.

The mobile communication terminal main unit 1 is composed of a CPU built-in logic circuit 11, an operation unit 12, a ROM 13, a RAM 14, a logic circuit 15, a display unit 16, a baseband processing section 17, a radio section 18 and an antenna 19. The CPU built-in logic circuit 11, the operation unit 12, the ROM 13, the RAM 14, the logic circuit 15, the display unit 16, and the baseband processing section 17 are connected to a bus line B1. The CPU built-in logic circuit 11, the operation unit 12, the ROM 13, the RAM 14, the logic circuit 15, the display unit 16, and the baseband processing section 17 can send and receive data by using this bus line B1. The baseband processing section 17 is connected to the radio section 18. The radio section 18 is connected to the antenna 19.

The CPU built-in logic circuit 11 has a function of controlling communication with the network, and a function of connecting of the mobile communication terminal with the network without entering an identification number even if the battery pack 2 is temporarily detached from the mobile communication terminal main unit 1. The CPU built-in logic circuit 11 is composed of a CPU 21, an internal RAM 22, an encryption processing section 23, an instantaneous power-down period measuring section 24, an instantaneous power-down detecting section 25, and an RTC (Real Time Clock) section 26.

The operation unit 12 is composed of a keyboard and can accept key input operations. The ROM 13 stores a program executable on the CPU built-in logic circuit 11. The RAM 14 provides a data area. When the mobile communication terminal main unit 1 can be connected to the network, the RAM 14 stores the user-updating data of data stored in the SIM card 3. The user-updating data is composed of abbreviated numbers registered by the user. The user-updating data stored in the SIM card 3 is updated based on the user-updating data stored in the RAM 14 when the mobile communication terminal main unit 1 is turned off.

The logic circuit 15 is a peripheral circuit needed to operate the mobile communication terminal. This logic circuit 15 includes a user gate circuit for implementing a function for controlling an interrupt by the user or call arrival, and a timer function used to measure time. The display unit 16 is composed of an LED and has a function for displaying various data such as an originator telephone number. The baseband processing section 17 has a function for converting a digital signal to be transmitted into an analog signal to send it to the radio section 18 and a function for converting an analog signal received by the radio section 18 into a digital signal. The radio section 18 has a function for acquiring the analog signal from electric field strength received by the antenna 19 and a function for controlling electric field strength generated by the antenna 19 in accordance with the analog signal to be transmitted. The antenna 19 has a function for generating the electric field strength for sending a radio signal to a base station (not shown) and a function for acquiring electric field strength for receiving a radio wave from the base station.

The battery pack 2 can be attached to and detached from the mobile communication terminal main unit 1. When attached to the mobile communication terminal main unit 1, the battery pack 2 supplies power to the mobile communication terminal main unit 1.

The SIM card 3 can be attached to and detached from the mobile communication terminal main unit 1. The SIM card 3 is attached to a SIM card attachment section (not shown) of the mobile communication terminal main unit 1. The SIM card attachment section is provided in a region where a user cannot access when the battery pack 2 is attached. When attached to the mobile communication terminal main unit 1, the SIM card 3 is connected to the CPU built-in logic circuit 11. The SIM card 3 stores data about a terminal user. The terminal user data contains a subscriber number (IMSI: International Mobile Subscriber Identify), an identification number (PIN: Personal Identification Number), a service status code, and abbreviated telephone numbers entered by the subscriber.

Figure 2:
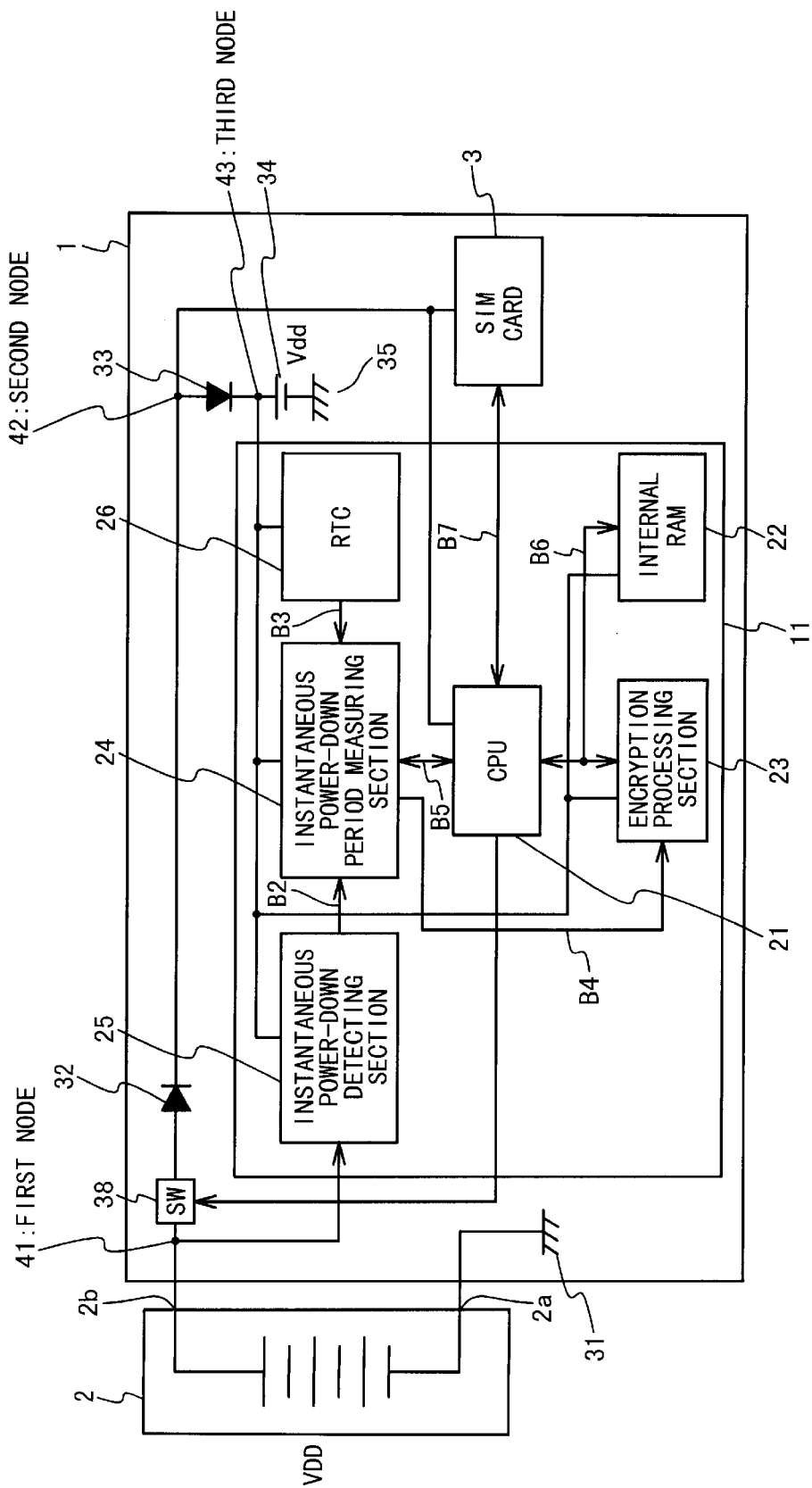
FIG. 2 is a diagram showing connection of a CPU built-in logic circuit, a cell pack and a SIM card.

FIG. 2 shows connection between the CPU built-in logic circuit 11, the battery pack 2, and the SIM card 3. First, connection associated with the power between the CPU built-in logic circuit 11, the battery pack 2 and the SIM card 3 will be shown below.

Referring to FIG. 2, the battery pack 2 is connected with a ground 31 at one end 2a in the mobile communication terminal main unit 1. The battery pack 2 is connected with a first node 41 at the other end 2b via a switch SW 38. The first node 41 is connected with one end of a first diode 32 and the instantaneous power-down detecting section 25. The first diode 32 is connected to a second node 42 at the other end. A direction of the first diode 32 from the first node 41 to the second node 42 is assumed to be a forward direction. The second node 42 is connected to the SIM card 3, the CPU 21, and one end of a second diode 33. The other end of the second diode 33 is connected to a third node 43. A direction of the second diode 33 from the second node 42 to the third node 43 is assumed to be a forward direction.

The third node 43 is connected to a backup power supply 34, the internal RAM 22, the encryption processing section 23, the instantaneous power-down period measuring section 24, the instantaneous power-down detecting section 25, and the RTC section 26. The other end of the backup power supply 34 is connected to the ground 35.

Thus, when the battery pack 2 is attached to the mobile communication terminal main unit, the battery pack 2 supplies power to the SIM card 3, the CPU 11, the internal RAM 22, the encryption processing section 23, the instantaneous power-down period measuring section 24, the instantaneous power-down detecting section 25, and the RTC section 26. When the battery pack 2 is not attached to the mobile communication terminal main unit 1, the backup power supply 34 supplies power to the internal RAM 22, the encryption processing section 23, the instantaneous power-down period measuring section 24, the instantaneous power-down detecting section 25, and the RTC section 26. In this case, no power is supplied to the SIM card 3 and the CPU 21.

Next, connection associated with the data transmission and reception between the CPU built-in logic circuit 11 and the SIM card 3 will be described below. Referring to FIG. 2, the bus line B2 connects the instantaneous power-down detecting section 25 with the instantaneous power-down period measuring section 24. The bus line B3 connects the instantaneous power-down period measuring section 25 with the RTC section 26. The bus line B4 connects the instantaneous power-down period measuring section 25 with the encryption processing section 23. The bus line B5 connects the instantaneous power-down period measuring section 25 with the CPU 21. The bus line B6 connects the CPU 21, the internal RAM 22, and the encryption processing section 23. The bus line B6 cannot be monitored from outside the CPU built-in logic circuit 11. The bus line B7 connects the CPU 21 with the SIM card 3.

The functions of the CPU 21, internal RAM 22, encryption processing section 23, instantaneous power-down period measuring section 24, instantaneous power-down detecting section 25, and RTC section 26 in the CPU built-in logic circuit 11 will be described below.

The internal RAM 22 stores data used by the CPU 21 and an encrypted PIN number. Data in the internal RAM 22 cannot be read out from outside the CPU built-in logic circuit 11.

The encryption processing section 23 generates a random number when the mobile communication terminal is set to a communicable state. The encryption processing section 23 holds this random number until a reset signal is supplied from the instantaneous power-down period measuring section 25 to the encryption processing section 23. The encryption processing section 23 holds the encrypted PIN number until the CPU 21 decrypts the encrypted PIN number stored in the internal RAM 22 using the random number.

The instantaneous power-down detecting section 24 monitors the voltage level of the power supplied from the battery pack 2 to check if the battery pack 2 supplies the power to the mobile communication terminal main unit 1. When the voltage level changes from a value greater than or equal to a predetermined threshold value to a value smaller than the threshold value, the instantaneous power-down detecting section 24 generates a voltage supply stopped signal to the instantaneous power-down period measuring section 25 to indicate that the supply of the power from the battery pack 2 to the mobile communication terminal main unit 1 has been stopped. Also, when the voltage level changes from a value smaller than the predetermined threshold value to a value greater than or equal to the threshold value, the instantaneous power-down detecting section 24 generates a voltage supply started signal to the instantaneous power-down period measuring section 25 to indicate that the supply of the power from the battery pack 2 to the mobile communication terminal main unit 1 has been started.

The instantaneous power-down period measuring section 25 starts counting the time in response to the voltage supply stopped signal from the instantaneous power-down detecting section 24. The instantaneous power-down period measuring section 25 stops counting the time in response to the voltage supply started signal from the instantaneous power-down detecting section 24. The RTC section 26 generates a clock signal and supplies it to the instantaneous power-down period measuring section 25. The above timer counting operation uses the clock signal supplied from the RTC section 26. The counted timer value is outputted to the CPU 21. When the count value exceeds a predetermined value during the timer counting operation, the instantaneous power-down period measuring section 25 generates a reset request signal to the encryption processing section 23.

When the mobile communication terminal main unit 1 is started, the CPU 21 acquires the timer value counted by the instantaneous power-down period measuring section 25. Then, the CPU 21 compares this timer value with a predetermined value. When the timer value is smaller than the predetermined value, the CPU 21 uses the random number stored in the encryption processing section 23 to decrypt the encrypted PIN number stored in the internal RAM 22. Then, the CPU 21 compares the decrypted PIN number with the PIN number stored in the SIM cards 3. When they are coincident with each other, the mobile communication terminal is set to a communicable state.

When the timer value is equal to or greater than the predetermined value, the CPU 21 requests the user to enter an identification number from the operation unit 12. Then, the CPU 21 compares the entered identification number with the PIN number stored in the SIM card 3. When they are coincident with each other, the mobile communication terminal is set to the communicable state.

When the mobile communication terminal is in the communicable state, the CPU 21 uses the random number generated by the encryption processing section 23 to encrypt the PIN number of the currently attached SIM card 3. This encrypted PIN number is stored in the internal RAM 22. It should be noted that the mobile communication terminal according to the present invention is sufficient to be configured in such a manner that data exchange between the internal RAM 22, the encryption processing section 23 and the CPU 21 cannot be monitored from outside the CPU built-in logic circuit 11. Also, it is possible to encrypt and decrypt data carried on a bus line for connecting the internal RAM 22 and the CPU 21 by using a random number stored in the encryption processing section 23. In this case, all data stored in the internal RAM 22 cannot be read out when the random number stored in the encryption processing section 23 is cleared.

Figure 3:
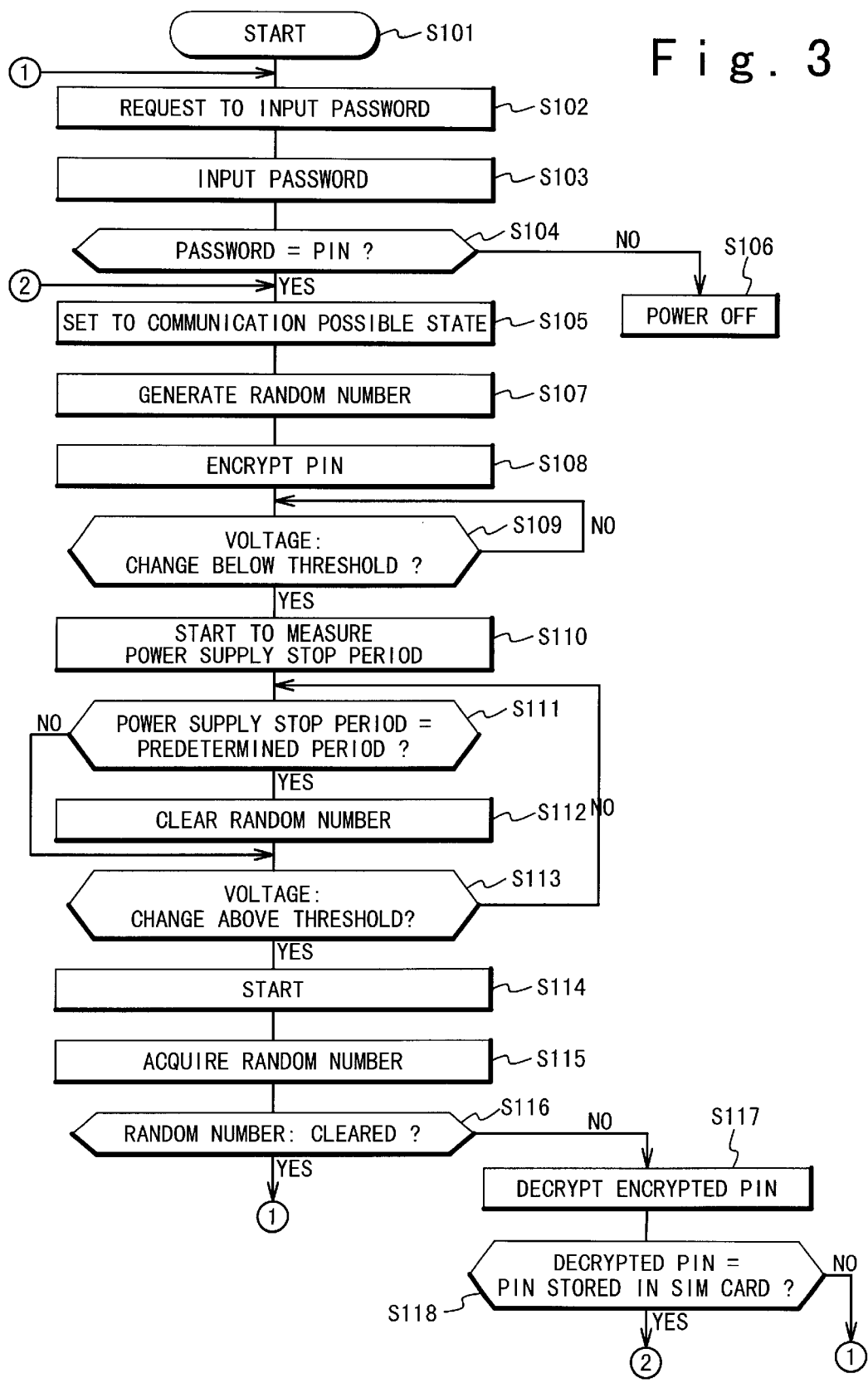
FIG. 3 is a flow chart showing a switching operation to a communicable state when the supply of power to the mobile communication terminal is stopped temporarily in the present invention.

The operations of the mobile communication terminal according to the present invention will be described below. FIG. 3 shows the shift to the communicable state when the power supply to the mobile communication terminal is stopped temporarily.

Referring to FIG. 3, it is supposed that the SIM card 3 and the battery pack 2 are attached to the mobile communication terminal main unit 1. When a power key (not shown) on the operation unit 12 is operated, the switch 38 is set to the on state so that the mobile communication terminal is started (step S101). Then, the CPU 21 requests the user to enter an identification number or a password based on a program stored in the ROM 13 (step S102). The user enters the identification number from the operation unit 12 (step S103).

The CPU 21 compares the entered identification number with the PIN number stored in the SIM card 3 (step S104). When the entered identification number is coincident with the PIN number, the mobile communication terminal main unit 1 is set to the communicable state with the network (Step S105). When the entered identification number differs from the PIN number, the CPU 21 controls the switch 38 such that power is forcibly turned off (step S106).

Instead, the step S106 may be attained as follows. That is, when the entered identification number differs from the PIN number, a counter is started. When the counter value is smaller than or equal to a predetermined value, the mobile communication terminal carries out processing at the step S102 and the subsequent. When the counter value is coincident with another predetermined value, the power is forcibly turned off in the mobile communication terminal. The counter value is cleared when the number entered from the operation unit 12 is coincident with the PIN (step S105).

Next, the encryption processing section 23 generates one random number (step S107), and holds this random number. The encryption processing section 23 uses the random number generated at the step S107 to encrypt the PIN number read out from the attached SIM card 3 (step S108). The encrypted PIN number is stored in the internal RAM 22.

Also, the instantaneous power-down detecting section 24 monitors the voltage of the power supplied from the battery pack 2 (step S109). When the voltage changes from a value equal to or larger than a predetermined value to a value smaller than the predetermined value, the instantaneous power-down detecting section 24 generates a power down signal. When the voltage is smaller than the predetermined value, the power is not supplied to the CPU 21 and the SIM card 3. In this case, even when the voltage is smaller than the predetermined value, the power is supplied from the backup power supply 34 to the internal RAM 22, the encryption processing section 23, the instantaneous power-down detecting section 24, the instantaneous power-down period measuring section 25, and the RTC section 26 in the mobile communication terminal main unit 1.

At a step S110, the instantaneous power-down period measuring section 25 resets the counter value to 0 in response to the power down signal, and starts counting of a power supply stopped period. When the counted power supply stopped period reaches a predetermined time (step S111), the instantaneous power-down period measuring section 25 generates a time out signal. The encryption processing section 23 clears or deletes the random number stored therein in response to the time out signal (step S112). While the voltage of the power supplied from the battery pack 2 remains smaller than the predetermined value (step S113), the processing at the step S111 and the subsequent is executed repeatedly.

When the instantaneous power-down detecting section 24 detects the voltage change of the power from the value smaller than the predetermined value to a value equal to or larger than the predetermined value (step S113), the instantaneous power-down detecting section 24 generates a power recovery signal.

At the step S114, the switch 38 is set to the on state so that the mobile communication terminal main unit 1 is started, when the power key (not shown) on the operation unit 12 is operated. At the same time, the supply of the power from the battery pack 2 is recovered so that the power is supplied to the CPU 21 and the SIM card 3. Then, at a step S115, the CPU 21 determines whether the random number stored in the encryption processing section 23 is cleared (step S116). When the random number is cleared, the processing at the step S102 and the subsequent is executed.

When this random number is not cleared, the CPU 21 retrieves the random number from the encryption processing section 23 and decrypts the encrypted PIN number stored in the internal RAM (step S117). Then, the CPU 21 reads out the PIN number from the SIM card 3 and compares the PIN number decrypted at the step S117 with the PIN number read out from the SIM card 3 (step S118). When they are coincident with each other, the CPU 21 sets the mobile communication terminal main unit 1 to the communicable state (step S105) and performs processing at the step S107 and the subsequent. When they are not coincident, the CPU 21 carries out the processing at the step S102 and the subsequent.

In the mobile communication terminal according to the present invention, a confirmation operation by the user including a key input can be omitted when the battery is temporarily detached from the mobile communication terminal main unit. Thus, the operation is simplified. Especially, the simplification is convenient to the user when the battery pack temporarily stops the supply of the power to the mobile communication terminal main unit because of the replacement of the battery pack, a temporarily detaching operation of the battery pack, or contact failure between the battery pack and the mobile communication terminal main unit.

The mobile communication terminal according to the present invention manages information about the identification number in the internal circuits and bus lines without permitting access from outside.

What is claimed is:

1. A mobile communication terminal comprising:
   an IC card which stores an identification number;
   a power supply which supplies power to said mobile communication terminal;
   a control section which can set said mobile communication terminal to a communication possible state when said power is supplied from said power supply and an entered identification number is coincident with said identification number stored in said IC card, and can set said mobile communication terminal to the communication possible state depending on a power down time period without an entering operation of said identification number when the supply of said power to said mobile communication terminal is stopped and then recovered.

2. The mobile communication terminal according to claim 1, wherein while said power is supplied from said power supply, said control section reads out said identification number from said IC card;
   said mobile communication terminal further comprises:
   a storage section; and
   an encrypting section which encrypts the read out identification number using a random number, stores the encrypted identification number in said storage section, and holds said random number.

3. The mobile communication terminal according to claim 2, further comprising:
   a detecting section which detects said power down of said power supplied from said power supply to generate a power down signal, and detects recovery of said power supplied from said power supply to generate a power recovery signal; and
   a measuring section which starts counting of said power down time period in response to said power down signal and stops the counting of said power down time period, and
   wherein said control section reads out said encrypted identification number from said storage section, decrypts said encrypted identification number using said random number held in said encrypting section, when the counted power down time period between said power down and said power recovery is shorter than a predetermined time period, and sets said mobile communication terminal to said communication possible state when said decrypted identification number is coincident with said identification number stored in said IC card.

4. The mobile communication terminal according to claim 3, wherein said measuring section deletes said random number held in said encrypting section, when the counted power down time period after said power down is equal to or longer than the predetermined time period.

5. The mobile communication terminal according to claim 2, further comprising a backup power supply, and wherein said storage section and said encrypting section are operable based on power supplied from said backup power supply when the supply of said power from said power supply is down.

6. The mobile communication terminal according to claim 3, further comprising a backup power supply, and wherein said storage section, said encrypting section, said detecting section and said measuring section are operable based on power supplied from said backup power supply when the supply of said power from said power supply is down.

7. The mobile communication terminal according to claim 1, wherein said IC card is composed of a SIM card.

8. A method of setting a mobile communication terminal to a communication possible state, comprising the steps of:
   (a) supplying power from a power supply;
   (b) entering an identification number from an operation unit;
   (c) comparing the entered identification number with an identification number stored in an IC card;
   (d) setting said mobile communication terminal to said communication possible state when said power is supplied from said power supply and an entered identification number is coincident with said identification number stored in said IC card; and
   (e) setting said mobile communication terminal to said communication possible state depending on a power down time period without said (b) entering step when the supply of said power from said power supply is downed and then recovered.

9. The method according to claim 8, wherein said (d) setting step comprises the steps of:
   (f) reading out said identification number from said IC card while said power is supplied from said power supply;

(g) encrypting the read out identification number using a random number;

(h) storing the encrypted identification number in a storage section; and (i) holding said random number.

10. The method according to claim 9, wherein said (e) setting step comprises the steps of:

said power down of said power supplied from said power supply to generate a power down signal;

detecting the recovery of said power supplied from said power supply to generate a power recovery signal;

counting of said power down time period in response to said power down signal and stops the counting of said power down time period;

reading out said encrypted identification number from said storage section;

decrypting said encrypted identification number using said random number held in said encrypting section, when the counted power down time period between said power down and said power recovery is shorter than a predetermined time period; and setting said mobile communication terminal to said communication possible state when said decrypted identification number is coincident with said identification number stored in said IC card.

11. The mobile communication terminal according to claim 10, wherein said (e) setting step further comprises the steps of:

deleting said random number held in said encrypting section, when the counted power down time period after said power down is equal to or longer than the predetermined time period.

12. The method according to claim 8, wherein said IC card is composed of a SIM card.

* * * * *